(12) United States Patent
Marin

(10) Patent No.: US 6,719,817 B1
(45) Date of Patent: Apr. 13, 2004

(54) CAVITATION HYDROGEN GENERATOR

(76) Inventor: Daniel J Marin, P.O. Box 6813, Columbia, MD (US) 21045

( * ) Notice: Subject to any disclaimer, the term of this patent is extended or adjusted under 35 U.S.C. 154(b) by 0 days.

(21) Appl. No.: 10/462,563

(22) Filed: Jun. 17, 2003

(51) Int. Cl.$^7$ ................................................. B01J 7/00
(52) U.S. Cl. ............................ 48/61; 48/62 R; 48/85.2; 48/197 R; 422/225; 422/234; 423/658.2
(58) Field of Search ...................... 48/61, 62 R, 85.2, 48/197 R; 422/224, 225, 234; 423/648.1, 658.2

(56) References Cited

U.S. PATENT DOCUMENTS

| | | |
|---|---|---|
| 3,969,493 A | 7/1976 | Fujii et al. |
| 3,980,053 A | 9/1976 | Horvath |
| 4,155,712 A | 5/1979 | Taschek |
| 4,164,397 A * | 8/1979 | Hunt et al. ................... 48/209 |
| 4,269,818 A | 5/1981 | Suzuki |
| 4,343,624 A | 8/1982 | Belke et al. |
| 4,371,500 A | 2/1983 | Papineau |
| 4,458,634 A | 7/1984 | Carr et al. |
| 4,599,865 A | 7/1986 | Dalal |
| 5,082,544 A | 1/1992 | Willey et al. |
| 5,658,681 A | 8/1997 | Sato et al. |
| 5,679,236 A | 10/1997 | Poschl |
| 5,833,934 A | 11/1998 | Adlhart |

* cited by examiner

*Primary Examiner*—Glenn Caldarola
*Assistant Examiner*—Basia Ridley
(74) *Attorney, Agent, or Firm*—Michael I Kroll

(57) ABSTRACT

A cavitating hydrogen generator is provided to mechanically separate hydrogen molecules from water to be used as a fuel source. Turbines fans rotating at a high RPM agitate water that is introduced into a vacuum and captures and separates the resulting hydrogen and oxygen molecules and stores the hydrogen molecules and purges the oxygen molecules. Any remaining water molecules existing as vapor or otherwise are transported through a recycling conduit where they are cooled prior to reintroduction to the cavitation chamber.

5 Claims, 8 Drawing Sheets

CAVITATION HYDROGEN GENERATOR

BACKGROUND OF THE INVENTION

1. Field of the Invention

The present invention relates generally to the generation of hydrogen gas and, more specifically, to the generation of hydrogen gas by cavitation from water.

Hydrogen can be manufactured or extracted from water in many ways. Typically, chemical, electrical, electrochemical, or thermo-chemical reactions are used to generate hydrogen, in some of which cases water may be used as the source of the hydrogen. In the present invention, cavitation effect in water is used to generate hydrogen without employing additional chemical, electrical, or other means. The present invention's cavitation means of generating hydrogen from water is mechanical in nature.

When a mass of water is in contact with gaseous mass such as the air, phase interchange occurs naturally, in which some of the water molecules escape into the air in one hand while moisture in the air is recaptured into the water. Eventually, in a closed system, equilibrium is reached, given a constant temperature.

Random energy fluctuation on individual water molecules enable a small portion of the water molecules to achieve enough escape energy to evaporate into the air. With a higher temperature, a greater number of molecules achieves this escape energy. This process can be most efficient in a vacuum as the recapturing process is eliminated.

A small portion of these escaping water molecules gains higher energy and breaks down into component atoms, which, in turn, form covalent diatomic molecules of hydrogen and oxygen in short order. Agitating the water molecules by mechanical means can accelerate this process of cavitation by introducing additional energy in the form of mechanical impact energy.

The present invention of the cavitation hydrogen generator delivers high mechanical impact energy to water molecules while also creating a near vacuum in which to do so, thereby maximizing the cavitation effect. This "agitation" is carried out by a number of high-speed, turbine blades units incased in a sectioned, double-walled housing. The agitation action is carried out by the individual blades spinning at high speed while creating centrifugal force on the water and gas mixture present in the space of the turbine blades units. The turbine back plates and section walls of the housing unit regulate the flow of the mixture so that the mixture is directed to the center of each of the turbine blades units at each stage.

The outer wall of the unit is coated with carbon fiber to preclude the passage of hydrogen outside the unit.

2. Description of the Prior Art

There are other hydrogen generating devices. Typical of these is U.S. Pat. No. 3,969,493 issued to Fujii, et al. on Jul. 13, 1976.

Another patent was issued to Stephen Horvath on Sep. 14, 1976 as U.S. Pat. No. 3,980,053. Yet another U.S. Pat. No. 4,155,712 was issued to Walter G. Taschek on May 22, 1979 and still yet another was issued on May 26, 1981 to Masahiro Suzuki as U.S. Pat. No. 4,269,818.

Another patent was issued to Belke, et al. on Aug. 10, 1982 as U.S. Pat. No. 4,343,624. Yet another U.S. Pat. No. 4,371,500 was issued to Ronald I. Papineau on Feb. 1, 1983. Another was issued to Carr, et al. on Jul. 10, 1984 as U.S. Pat. No. 4,458,634 and still yet another was issued on Jul. 15, 1986 to Rajendra P. Dalal as U.S. Pat. No. 4,599,865.

Another patent was issued to Willey, et al. on Jan. 21, 1992 as U.S. Pat. No. 5,082,544 and Huffman was issued U.S. Pat. No. 5,419,306 on May 30, 1995. Yet another U.S. Pat. No. 5,658,681 was issued to Sato, et al. on Aug. 19, 1997. Another was issued to Günter Pöschl on Oct. 21, 1997 as U.S. Pat. No. 5,679,236 and still yet another was issued on Nov. 10, 1998 to Otto J. Adlhart as U.S. Pat. No. 5,833,934.

U.S. Pat. No. 3,969,493

Inventor: Fujii, et al.

Issued: Jul. 13, 1976

Calcium hydroxide and iodine are reacted with each other in the presence of water to produce calcium iodate and calcium iodide, the former of which precipitates from the reaction solution and is obtained by filtration and the latter of which is thereafter separated from the filtrate by evaporation separation. The calcium iodate is heated until it is converted into calcium oxide, whereafter there ensues generation of a mixed gas of iodine and oxygen. The mixed gas is cooled causing the iodine component thereof to solidify and pure oxygen gas is consequently liberated to be obtained as one product. The calcium iodide is solidified and subsequently heated under a current of steam to cause it to undergo conversion into calcium oxide with liberation of hydrogen iodide gas. The hydrogen iodide gas thus liberated is then separated by a known method into iodine and hydrogen which is obtained as another product. The calcium oxide and iodine remaining after separation of oxygen and hydrogen are recycled to serve again as starting reactants.

U.S. Pat. No. 3,980,053

Inventor: Stephen Horvath

Issued: Sep. 14, 1976

A fuel supply apparatus generates, hydrogen and oxygen by electrolysis of water. There is provided an electrolytic cell which has a circular anode surrounded by a cathode with a porous membrane therebetween. The anode is fluted and the cathode is slotted to provide anode and cathode areas of substantially equal surface area. A pulsed electrical current is provided between the anode and cathode for efficient generation of hydrogen and oxygen. The electrolytic cell is equipped with a float, which detects the level of electrolyte within the cell, and water is added to the cell as needed to replace the water lost through the electrolysis process. The hydrogen and oxygen are collected in chambers which are an integral part of the electrolytic cell, and these two gases are supplied to a mixing chamber where they are mixed in the ratio of two parts hydrogen to one part oxygen. This mixture of hydrogen and oxygen flows to another mixing chamber wherein it is mixed with air from the atmosphere. The system is disclosed as being installed in an automobile, and a dual control system, which is actuated by the automobile throttle, first meters the hydrogen and oxygen mixture into the chamber wherein it is combined with air and then meters the combined mixture into the automobile engine. The heat of combustion of a pure hydrogen and oxygen mixture is greater than that of a gasoline and air mixture of comparable volume, and air is therefore mixed with the hydrogen and oxygen to produce a composite mixture which has a heat of combustion approximating that of a normal gas-air mixture. This composite mixture of air, hydrogen and oxygen then can be supplied directly to a conventional internal combustion engine without overheating and without creation of a vacuum in the system.

U.S. Pat. No. 4,155,712

Inventor: Walter G. Taschek

Issued: May 22, 1979

A relatively small size apparatus for generating hydrogen by the reaction of a metal hydride with water vapor is disclosed. The metal hydride utilized to generate the hydrogen gas is housed in a fuel chamber of the apparatus and water vapor is introduced into the fuel chamber through a porous membrane having selected characteristics. The metal hydride reacts with the water vapor in a conventional manner to produce pure hydrogen. A variable gas pressure-liquid pressure balance means for introduction of water vapor enables automatic hydrogen generation on demand and enables complete shut down when demand ceases. The apparatus of this invention may be operated at any selected constant pressure feed rate. Further, with the apparatus of this invention the water source is effectively isolated from the metal hydride by the porous membrane, which has hydrophobic characteristics, and as a consequence, both contamination of the water source and caking of the metal hydride fuel is minimized. The apparatus of this invention can be utilized as a hydrogen or other gas source in many applications where a source of hydrogen or other gas is required but is ideally suited for regulated and pressure feed applications, for example, as the hydrogen source for the hydrogen electrode of the fuel cell.

U.S. Pat. No. 4,269,8 18

Inventor: Masahiro Suzuki

Issued: May 26, 1981

Hydrogen is produced by immersing a piece of magnesium in an electrolytic solution containing, for example, nickel, chromium, manganese, iron or platinum and then by immersing the magnesium piece in a neutral salt solution containing, for example, NaCl or KCl, or in sea water. Furthermore, hydrogen is produced by keeping a magnesium piece in contact with a metal, such as iron in the neutral salt solution for a certain period of time and then by replacing the magnesium piece in another neutral salt solution. In the latter method, the generation of hydrogen can be accelerated by connecting the magnesium piece and the metal to a direct-current supply in the range of 5 V to 200 V for a short time before the magnesium piece is immersed in the second neutral salt solution.

U.S. Pat. No. 4,343,624

Inventor: Belke, et al.

Issued: Aug. 10, 1982

A three stage hydrogen generator (10), comprises a low BTU, carbon monoxide and hydrogen containing gas generation stage, a first reactor stage (12) for exothermically reducing ferric oxide with the low BTU gas and for generating superheated steam and a second reactor stage (14) for endothermically reacting steam and iron to produce substantially pure hydrogen gas. The hydrogen gas together with unreacted steam from the third stage (16) is directed to a condenser (18), preferably an air cooled unit, wherein the steam is condensed and the hydrogen gas recovered. The condensate (20) is cycled back to the second reactor (14) as the feed water for generating superheated steam and the heated cooling air (22) is directed to the first stage (12) for use in the generation of the low BTU gas. At least one, and preferably all, of the stages utilize a rotating fluidized bed. Desirably the condenser (18) is a rotating fluidized bed heat exchanger.

U.S. Pat. No. 4,371,500

Inventor: Ronald I. Papineau

Issued: Feb. 1, 1983

A hydrogen generating system which produces hydrogen instantaneously from water ready for use upon demand. The system includes a reactor that has reaction zones wherein catalyst and elevated temperatures generate hydrogen from steam. The zones in the reactor can be in the form of tubes about a heat generating chamber, and the zones are adapted to be interconnected to each other, to atmosphere, and to the source of steam, all to maximize the generation of hydrogen by providing a reactor of optimum flexibility. The present invention also is directed to systems which include the hydrogen generating system and which utilize the generated hydrogen as a fuel or as a chemical.

U.S. Pat. No. 4,458,634

Inventor: Carr, et al.

Issued: Jul. 10, 1984

A control system for maintaining a desired water level range from electrodes spaced thereabove in a layer of oil where alternating current discharge occurs from electrode down to and through water to another electrode, with the electrical discharge occurring between electrodes disposed at all times in the hydrocarbon oil layer. With the situs of reaction being confined to the oil and the interstitial boundry between the oil and water, dangerous conditions of hydrogen generation are generally obviated over most state-of-the-art methods of producing hydrogen with a highly efficient production process. Hydrocarbon gases and vapors are also produced from the oil with a cracking process occuring to some extent incumbant with the A C discharge from the electrodes through the oil to the water. This has also been found to gradually upgrade the quality of the oil remaining while some is at the same time consumed in the system. The hydrocarbon gases and vapors are also subject to hydrogen enrichment during the ongoing process. In a system with hydrogen produced being used along with hydrocarbon gases and vapors produced from the oil to run an internal combustion engine A C power developed by an A C generator driven by the engine flows through a current transformer to a step transformer increasing the A C voltage applied to the electrodes used in the process. A C current being sensed develops a D C signal, through a rectifier, proportional to the A C power current being fed to the electrodes. The D C signal is passed through control circuity to activate individual relay controls when the signal level falls below a desired level and rises above a desired level. This is effective to, at preset signal levels, activate a pump or open a drain cock for removing water from the tank or another pump (or reversal of a pump) to feed water back to the tank to maintain the water level in the tank within a desired range consistent with desired rates of hydrogen generation through the process.

U.S. Pat. No. 4,599,865

Inventor: Rajendra P. Dalal

Issued: Jul. 15, 1986

A method and apparatus for combustion of hydrogen to produce heat, for example to generate steam for power generation. Water is electrolyzed and the hydrogen and a fraction of the oxygen products of electrolysis are passed immediately to a first combustion zone where the immediate combustion of the oxygen products and a function of the hydrogen products is effected. The products from this first combustion zone are immediately passed to a second combustion zone where combustion is again effected with the remaining fraction of the oxygen products of the electrolysis and the remaining hydrogen products from the first combustion zone. The heat generated is thereafter applied to the desired use, for example by passing the products of combustion from the second combustion zone through water to boil the water, the steam thereby produced being used for power generation. Apparatus to carry out this method is also described.

U.S. Pat. No. 5,082,544

Inventor: Willey, et al.

Issued: Jan. 21, 1992

An electrolytic gas generating apparatus for producing a combustible mixture of hydrogen and oxygen by electrolysis of water is disclosed, for particular use in a gas welding apparatus. The generating apparatus comprises a d.c. power supply 100 connected to electrolytic cells 200, a dehumidifier 400 for scrubbing the gas mixture generated by the cells 200, a gas regulator 500, a modifier 600 which modifies the combustion characteristics of the gas and a flash arrester 660. Gas generation is controlled by a main control board 800 in accordance with sensors which measure parameters to calculate indirectly the gas flowrate and control this in accordance with demand.

U.S. Pat. No. 5.419,306

Inventor: Huffman

Issued: May 30, 1995

An apparatus which uses friction to generate heat for heating liquids. The apparatus includes a cylindrical rotor disk housed inside a close-fitting housing structure. The rotor disk is connected to the shaft of a motor which turns the rotor disk at high revolutions inside the rotor chamber of the housing structure. The rotor disk has a plurality of curved, outward radiating, closed-end passageways formed therein. During operation, liquid flows into the housing structure via an inlet port which fills the rotor chamber of the housing structure and the curved passageways in the rotor disk. When the rotor disk is rotated at high speeds, the liquid located inside the curved passageways is pulled outward by centrifugal forces which creates a vacuum therein. When the vacuum becomes sufficient, the liquid "cracks" or boils at a low temperature. The resulting vapor formed inside the curved passageway suddenly forces the liquid remaining inside the curved passageway outward and exit at relatively high speed. The exiting liquid pushes against the leading inside surface of the curved passageway to help turn the rotor disk thereby increasing the efficiency of the apparatus. As the vapor in the curved passageway cools, it condenses to create a vacuum therein which draws the liquid back therein. When the liquid in the housing structure has reach a desired temperature, the vapor and the liquid is then allowed to exit via outlet ports.

U.S. Pat. No. 5,658,681

Inventor: Sato, et al.

Issued: Aug. 19, 1997

A fuel cell power generation system including a reforming reactor for reacting a fuel with water to produce a hydrogen-rich reformed gas including carbon monoxide; a CO shift reactor for carrying out a CO shift reaction to decrease the concentration of carbon monoxide in the reformed gas; a CO removal reactor for oxidizing carbon monoxide in the reformed gas to carbon dioxide; and a fuel cell for generating electric power by reaction of the reformed gas with a gaseous oxidizing agent. Processors determine output required of the fuel cell and a proper space velocity for reformed gas entering the CO removal means, based on input values for the amount of the reformed gas fed to the CO removal means and the determined output required of the fuel cell.

U.S. Pat. No. 5,679,236

Inventor: Gunter Poschl

Issued: Oct. 21, 1997

A fuel mixture combusting virtually free of pollutants and, in addition, requiring only very small quantities of combustible hydrocarbons is produced by introducing liquid fuel, low-nitrogen air and water into a chamber (9) provided with at least one ultrasonic oscillator (7); by decomposing the fuel introduced and at least partially decomposing the water by cavitation; by dispersing the water and the air in the decomposed fuel; and by at least partially electrolytically decomposing the water. The fuel mixture has a foam-like consistency, is very easily combustible and can be stored for a longer time.

U.S. Pat. No. 5,833,934

Inventor: Otto J. Adlhart

Issued: Nov. 10, 1998

The reaction of alkali, alkali-earth metal hydride with water is utilized for the generation of hydrogen in a novel generator configuration. This overcomes the problems encountered in earlier hydride based generator configurations inasmuch as it overcomes the problem associated with the expansion of the hydride upon its conversion to hydroxide or oxide when reacting with water. This is accomplished by using a hydride cartridge of unique configuration. The combination of the corrugated cartridge structure and the wicking material dispersed throughout the cartridge facilitate the complete utilization of the hydride and water in a demand responsive mode. This is important in applications where intermediate hydrogen storage is impractical, as is the case in the use of these generators—e.g., for electric power generation in fuel cells in general and for Underwater Vehicles specifically because space restraints.

While these hydrogen generating devices may be suitable for the purposes for which they were designed, they would not be as suitable for the purposes of the present invention, as hereinafter described.

SUMMARY OF THE PRESENT INVENTION

A primary object of the present invention is to provide a device for hydrogen generation.

Another object of the present invention is to produce hydrogen from water by utilizing the cavitation effect.

Yet another object of the present invention is to produce hydrogen without harmful by-products that pollute the air or else are difficult to discard.

Still yet another object of the present invention is to provide a simple, compact and economical mechanical device for the generation of hydrogen.

Yet another object of the present invention is to provide an environmentally clean, alternative energy source.

Another object of the present invention is to provide an alternative fuel for internal combustion engines and fuel cells.

Yet another object of the present invention is to provide a way to reduce foreign dependency on petroleum fuel.

Additional objects of the present invention will appear as the description proceeds.

The present invention overcomes the shortcomings of the prior art by providing a simple, compact and economical way to produce hydrogen.

The foregoing and other objects and advantages will appear from the description to follow. In the description, reference is made to the accompanying drawing, which forms a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
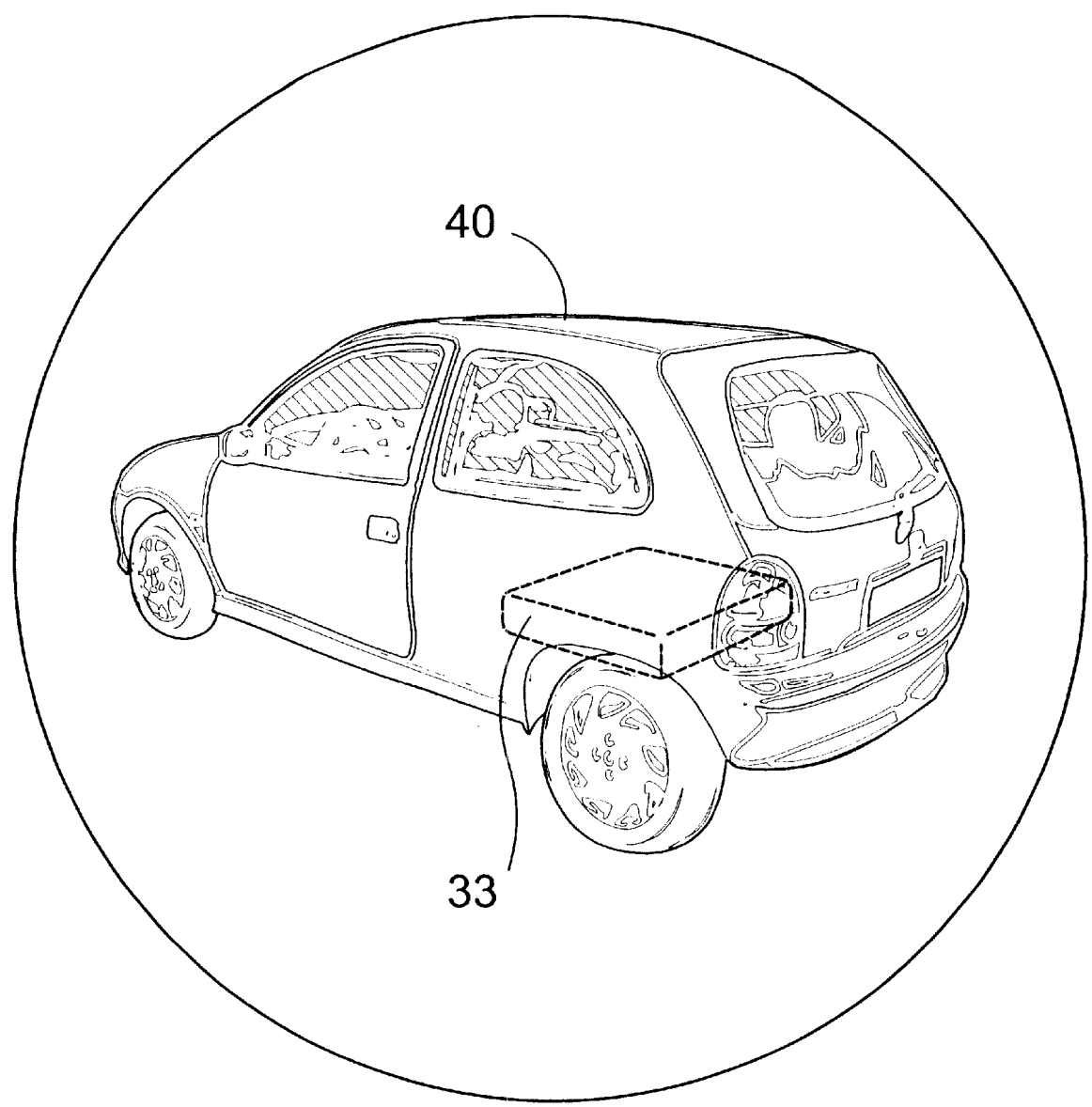
FIG. 1 is a perspective view of an automobile running on hydrogen.

Turning now descriptively to the drawings, in which similar reference characters denote similar elements throughout the several views, the figures illustrate the Variable Torsion Converter of the present invention. With regard to the reference numerals used, the following numbering is used throughout the various drawing figures.

10 cavitation hydrogen generator
12 housing assembly
14 outer wall of 12
16 inner wall of 12
17 cavitation chamber
18 first end wall of 12
20 second end wall of 12
21 gas mixture inlet port
22 water inlet port
23 gas mixture storage port
24 turbine assembly
25 turbine back plate
26 turbine blade
27 gas mixture recycling port
28 gas mixture
29 gas mixture recycling conduit
30 water conduit
31 hydrogen storage conduit
32 water
33 hydrogen storage tank
34 gas inlet conduit
36 power shaft
38 heat exchange
40 drive ring
42 central recess of 40
44 auto

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is a perspective view of an automobile running on hydrogen. Shown is an automobile 40 with a hydrogen fuel tank 33. The main goal of the current invention 10 is to produce hydrogen that can be used in automobiles 40 equipped with engines that are capable of running on hydrogen or on fuel cells. The main advantage of using hydrogen as a fuel is the clean exhaust byproduct of water vapor.

Figure 2:
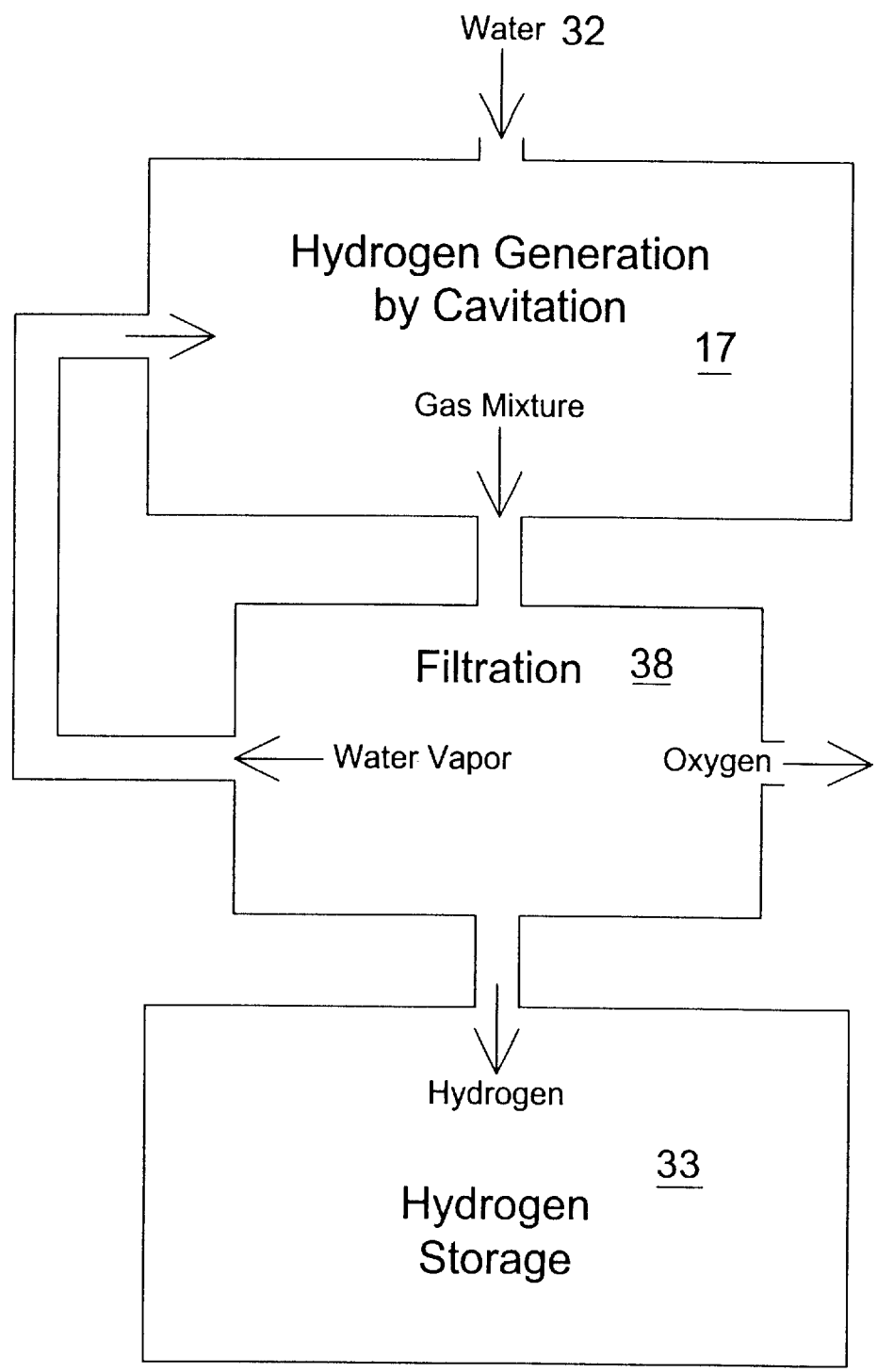
FIG. 2 is a schematic diagram of the process of hydrogen generation.

FIG. 2 is a schematic diagram of the process of hydrogen generation. A general process of generating hydrogen by cavitation is shown. The process consists of three major steps. The first is the generation of the hydrogen by cavitation. The gas mixture generated by cavitation is then filtered. Hydrogen and oxygen from the filtration process are separately stored next.

Figure 3:
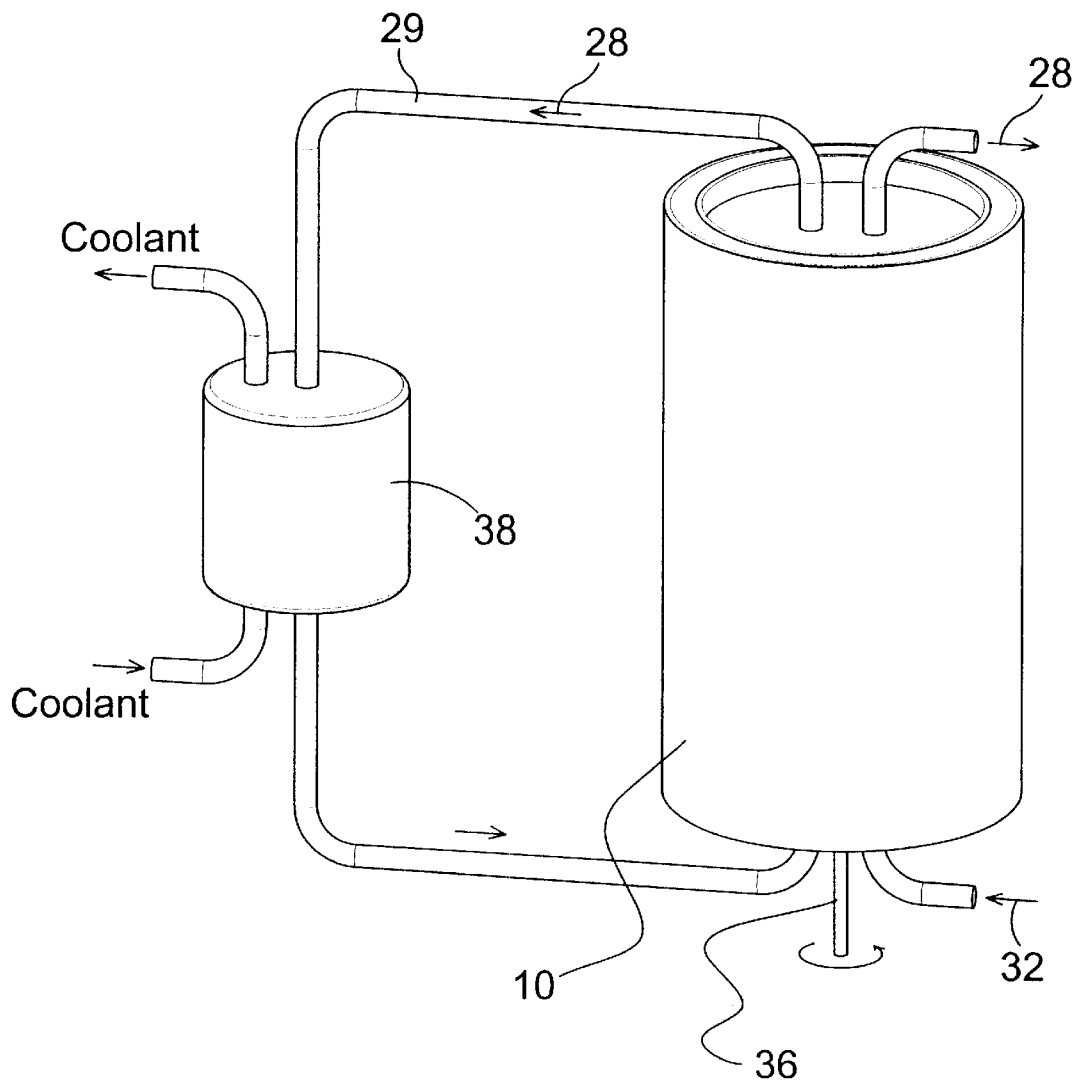
FIG. 3 is a perspective view of a representation of the cavitation hydrogen generator and assembly.

FIG. 3 is a perspective view of a representation of the cavitation hydrogen generator 10 and assembly. A realization of the cavitation hydrogen generator 10 is shown with a heat exchanger 38. The generator 10 is connected to a water supply line 10.

The generator's power shaft 36 is connected to a motor. The heat exchanger 38 extracts excessive heat from the gas mixture 28. The gas mixture 28 is eventually claimed for filtration into hydrogen and oxygen gas as well as into water vapor.

Figure 4:
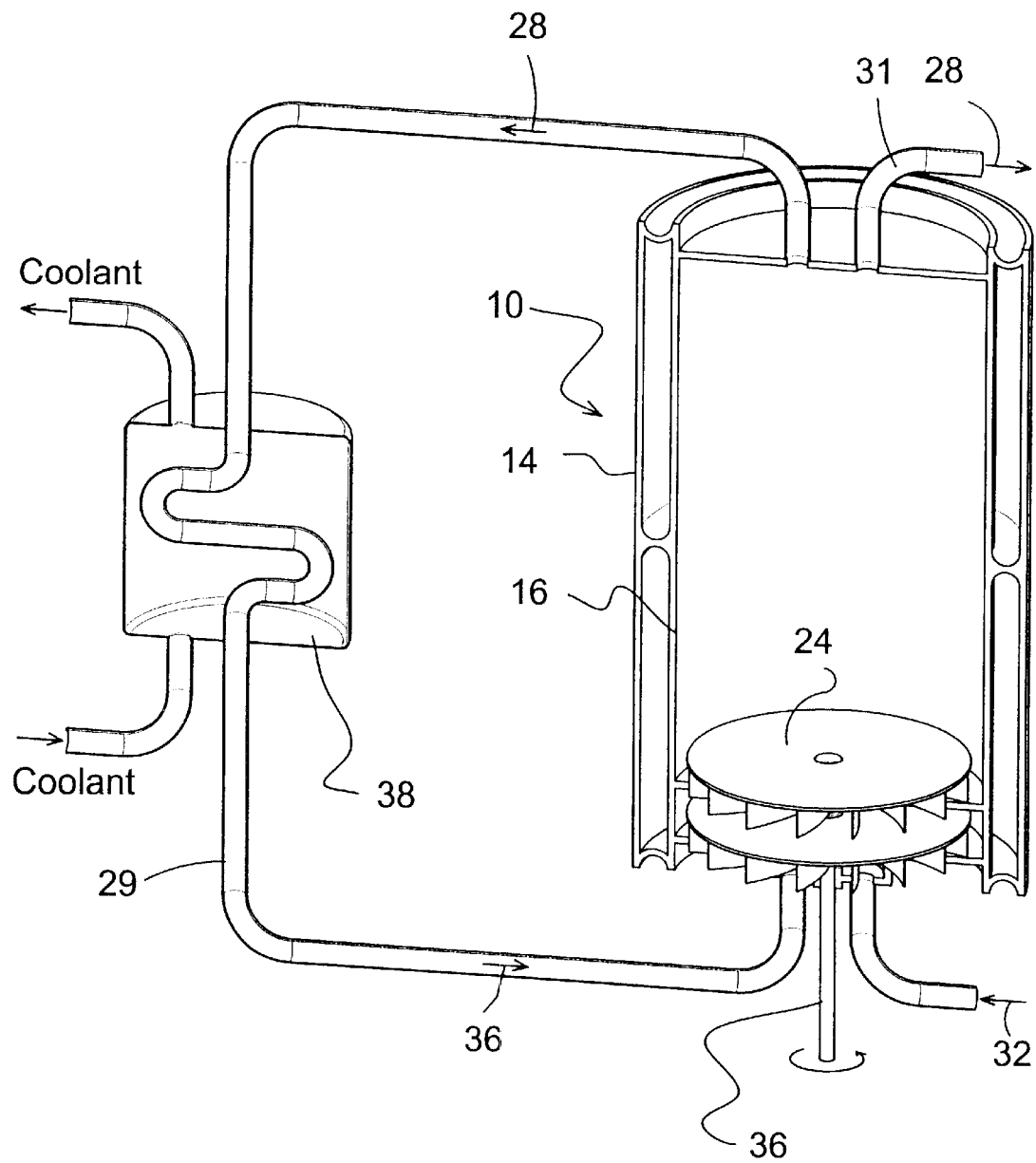
FIG. 4 is a cross-sectional view of the cavitation hydrogen generator assembly.

FIG. 4 is a cross-sectional view of the cavitation hydrogen generator assembly 10. The turbine assembly 24 comprises a number of turbine back plates 25 with turbine blades 26, and is connected to a motor, which spins the turbines at high speed. This turbine action agitates the water 32 in a near vacuum, inducing the cavitation effect. The cavitation hydrogen generator 10 is double-walled with the inside of the inner wall 16 lined with carbon fiber for protection.

Figure 5:
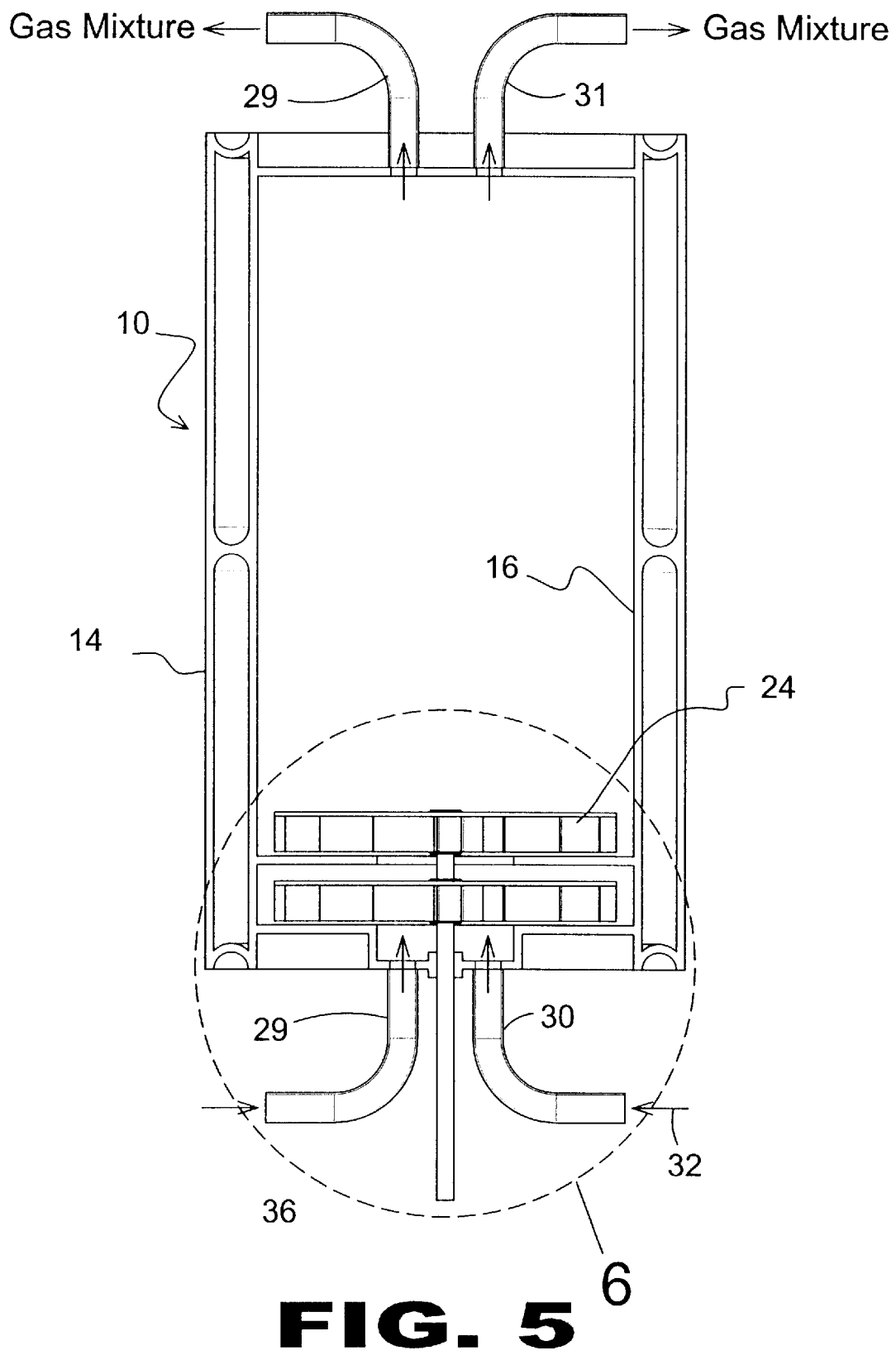
FIG. 5 is a cross-sectional view of the cavitation hydrogen generator.

FIG. 5 is a cross-sectional view of the cavitation hydrogen generator 10. The number of turbine assemblies 24 can be varied from one to many for optimum operation.

Figure 6:
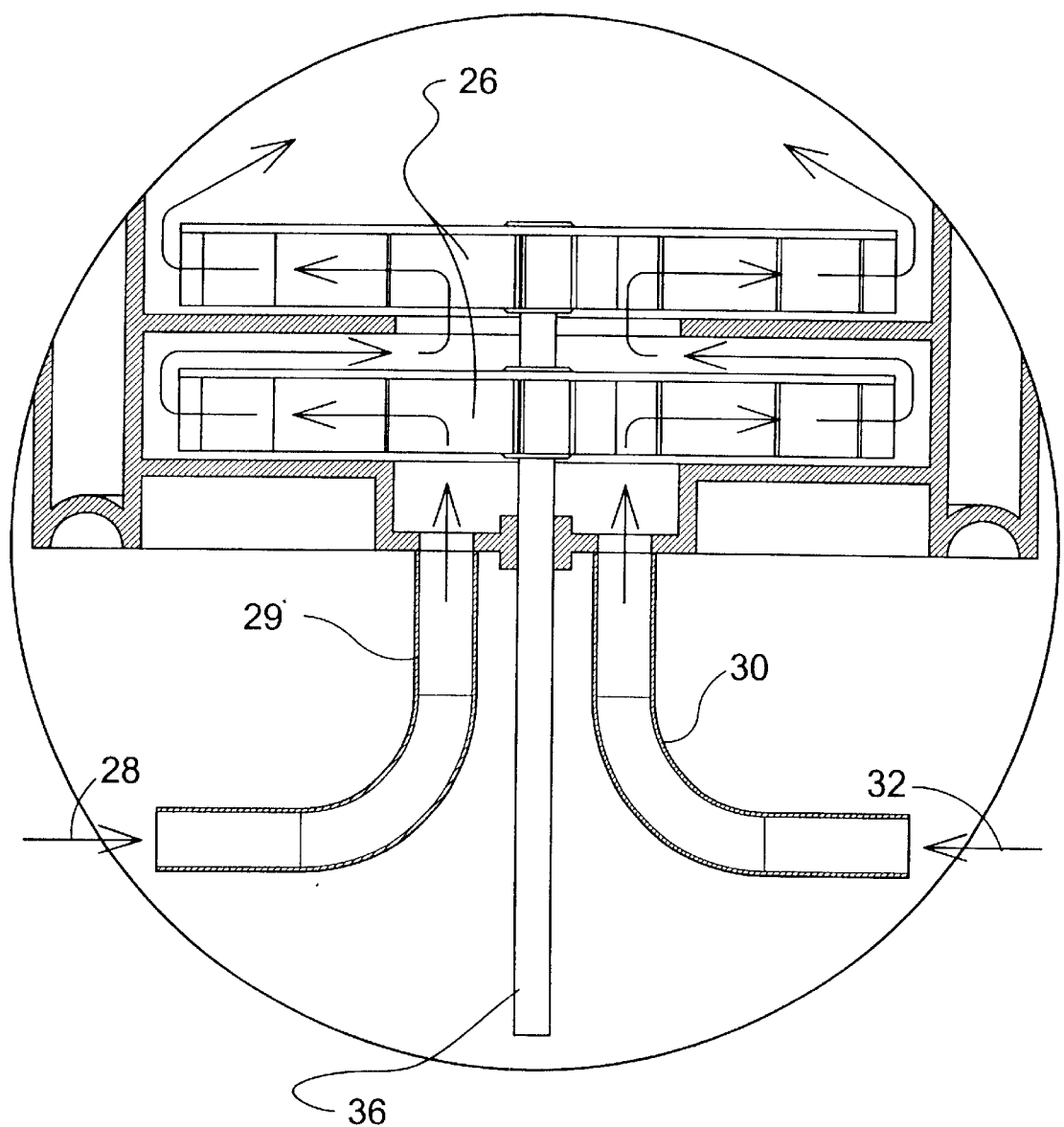
FIG. 6 is a close-up view of the turbine assembly.

FIG. 6 is a close-up view of the turbine assembly 24. Rapid spin of the turbines creates centrifugal force, which drives matter present within the turbine space outward and creates vacuum at the center, thereby drawing in the water 32 and the gas mixture 28 from below. The high speed of the turbines also delivers high impact energy on the molecules of the matter present. This agitation by the turbines 24, combined with the near vacuum created, induces the cavitation effect. Larger number of turbine blades 26 units will create better vacuum, but will spin at lower speed. Single turbine blades 26 unit will rotate faster and deliver higher impact energy.

Figure 7:
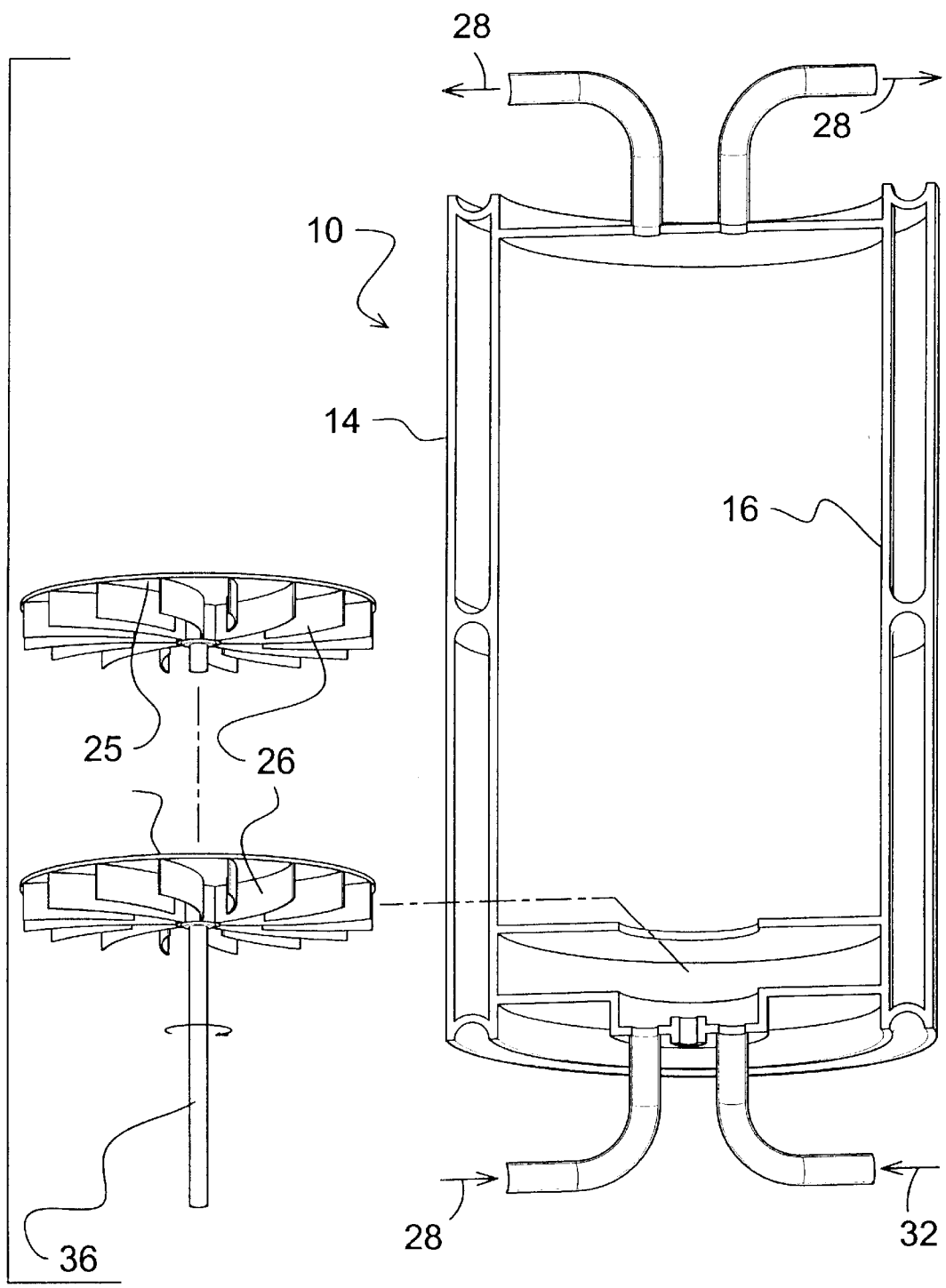
FIG. 7 is an exploded view of the cavitation hydrogen generator.

FIG. 7 is an exploded view of the cavitation hydrogen generator 10. A turbine assembly comprises a plurality of turbine blades 26 that are rigidly fixed on a turbine back plate 25. The turbine back plate 25 forces the matter driven by the blades 26 to move around it. Each of the turbine blades assemblies 24 are separated by the turbine section wall, thereby forcing the matter flow from the center of a turbine blades assembly 24 outward in each stage.

Figure 8:
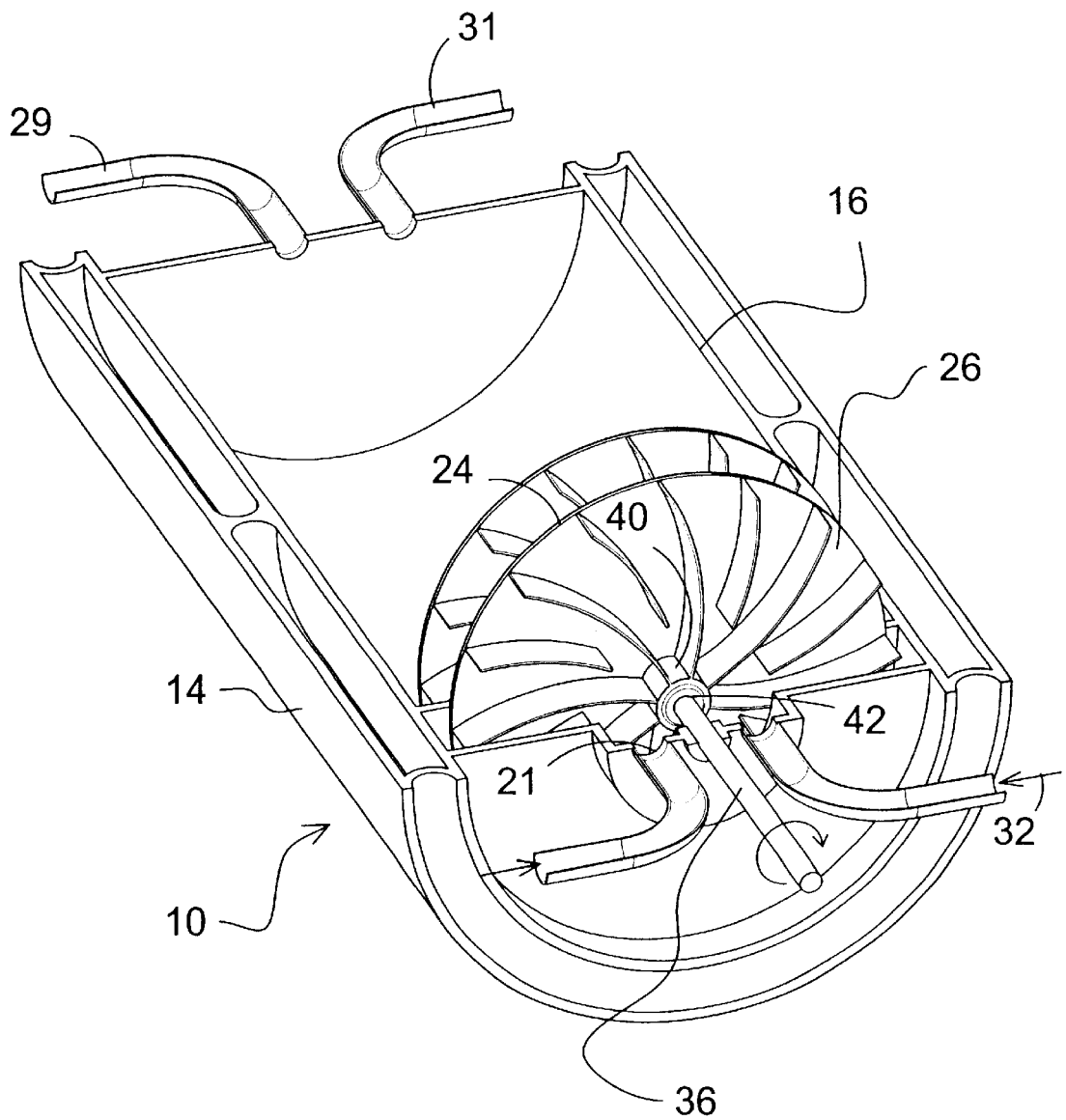
FIG. 8 is a perspective view of the sectioned cavitation hydrogen generator.

FIG. 8 is a perspective view of the sectioned cavitation hydrogen generator 10. Shown are the turbine blades assemblies 24 in their seats. The profile of the turbines blades 26 is generally curved in shape for efficient centrifugal impelling.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A cavitation hydrogen generator, comprising:
    a) a closed housing element including:
        i) a cylindrical inner housing wall, said inner housing wall defining a cavitation chamber therein;
        ii) a cylindrical outer housing concentrically spaced apart from said inner housing wall;
        iii) a first end wall, said first end wall having at least one water inlet port and one gas mixture inlet port;
        iv) a second end wall, said second end wall having at least one gas mixture recycling port and one hydrogen storage port;
    b) at least one turbine assembly disposed inside said cavitation chamber, said turbine assembly comprising a substantially circular back plate of a smaller diameter than that of said inner housing wall thus allowing it to rotate freely therein and having a plurality of curved turbine fan blades extending perpendicularly therefrom and radiating outwardly from a centrally located drive ring and terminating at the peripheral edge thereof, said drive ring including a power shaft emanating therefrom with the distal end thereof extending externally from said housing element and in communication with a motive means;
    c) a heat exchanger externally located relative to said housing element;
    d) a hydrogen storage tank
    e) a water inlet conduit communicating between said water inlet port and a pressurized water source;
    f) a gas mixture recycling conduit communicating between said gas mixture recycling port and said gas mixture inlet port and passing through said heat exchanger in order to remove any excessive heat from the gas mixture prior to reintroduction to said cavitation chamber; and
    g) a hydrogen storage conduit communicating between said hydrogen storage port and said hydrogen storage tank.

2. A cavitation hydrogen generator as recited in claim 1, wherein said motive means is a motor attached to said power shaft so as to rotate said power shaft and the associated turbine assemblies at a high RPM in order deliver high mechanical impact energy to the water molecules within said cavitation chamber in order to accelerate the breakdown thereof into covalent diatomic molecules of hydrogen and oxygen.

3. A cavitation hydrogen generator as recited in claim 1 wherein said hydrogen and oxygen molecules are separated and the hydrogen molecules are introduced into the hydrogen storage tank where they are stored for use as fuel.

4. A cavitation hydrogen generator as recited in claim 1, wherein any remaining water molecules are transported through said gas mixture recycling conduit thereby passing through said heat exchanger to cool the mixture prior to reintroduction into said cavitation chamber.

5. A cavitation hydrogen generator as recited in claim 1, wherein the inside of said inner wall is coated with carbon fiber to preclude the passage of hydrogen outside the unit.

* * * * *